(12) United States Patent
Mudalige et al.

(10) Patent No.: US 7,920,969 B2
(45) Date of Patent: *Apr. 5, 2011

(54) SYSTEM FOR AND METHOD OF DETERMINING A HOST VEHICLE LANE CHANGE

(75) Inventors: Upali Priyantha Mudalige, Troy, MI (US); William E. Hamilton, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1076 days.

This patent is subject to a terminal disclaimer.

(21) Appl. No.: 11/436,497

(22) Filed: May 18, 2006

(65) Prior Publication Data

US 2007/0043506 A1 Feb. 22, 2007

Related U.S. Application Data

(63) Continuation-in-part of application No. 11/207,168, filed on Aug. 18, 2005.

(51) Int. Cl.
*G06F 17/10* (2006.01)

(52) U.S. Cl. .......... 701/301; 701/93; 701/207; 701/213; 340/436; 340/903

(58) Field of Classification Search .................. 701/93, 701/207, 213, 301; 340/903, 435, 436
See application file for complete search history.

(56) References Cited

U.S. PATENT DOCUMENTS

| 5,375,059 | A * | 12/1994 | Kyrtsos et al. | 701/215 |
| 6,720,920 | B2 * | 4/2004 | Breed et al. | 342/386 |
| 6,768,944 | B2 * | 7/2004 | Breed et al. | 701/301 |
| 2002/0198632 | A1 * | 12/2002 | Breed et al. | 701/1 |

FOREIGN PATENT DOCUMENTS

| JP | H11-20499 | 1/1999 |
| JP | 2003-22130 | 1/2003 |

* cited by examiner

*Primary Examiner* — Gertrude Arthur Jeanglaud

(57) ABSTRACT

A tracking system adapted for use with communicatively coupled traveling host and remote vehicles, includes a locator device configured to determine sets of current position, and trail coordinates for each of the vehicles. The preferred system further includes sensors operable to determine a condition value for each vehicle at each of said set of coordinates, and a controller configured to determine a congruent path between the vehicles, and a congruent path divergence by the host vehicle, and cause the transmission of an alert of the divergence from the host vehicle to the remote vehicle using vehicle-to-vehicle communication.

17 Claims, 5 Drawing Sheets

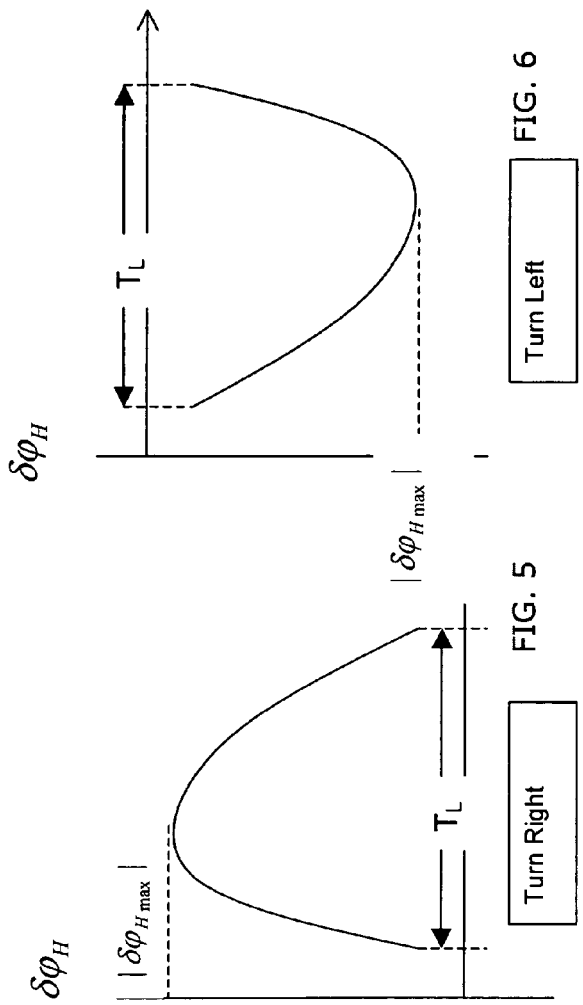
FIG. 5
FIG. 6
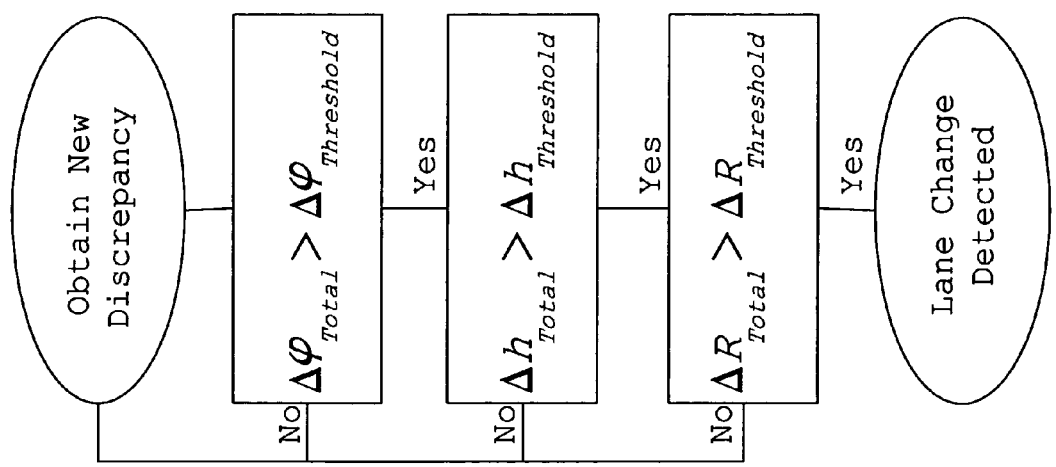
FIG. 4

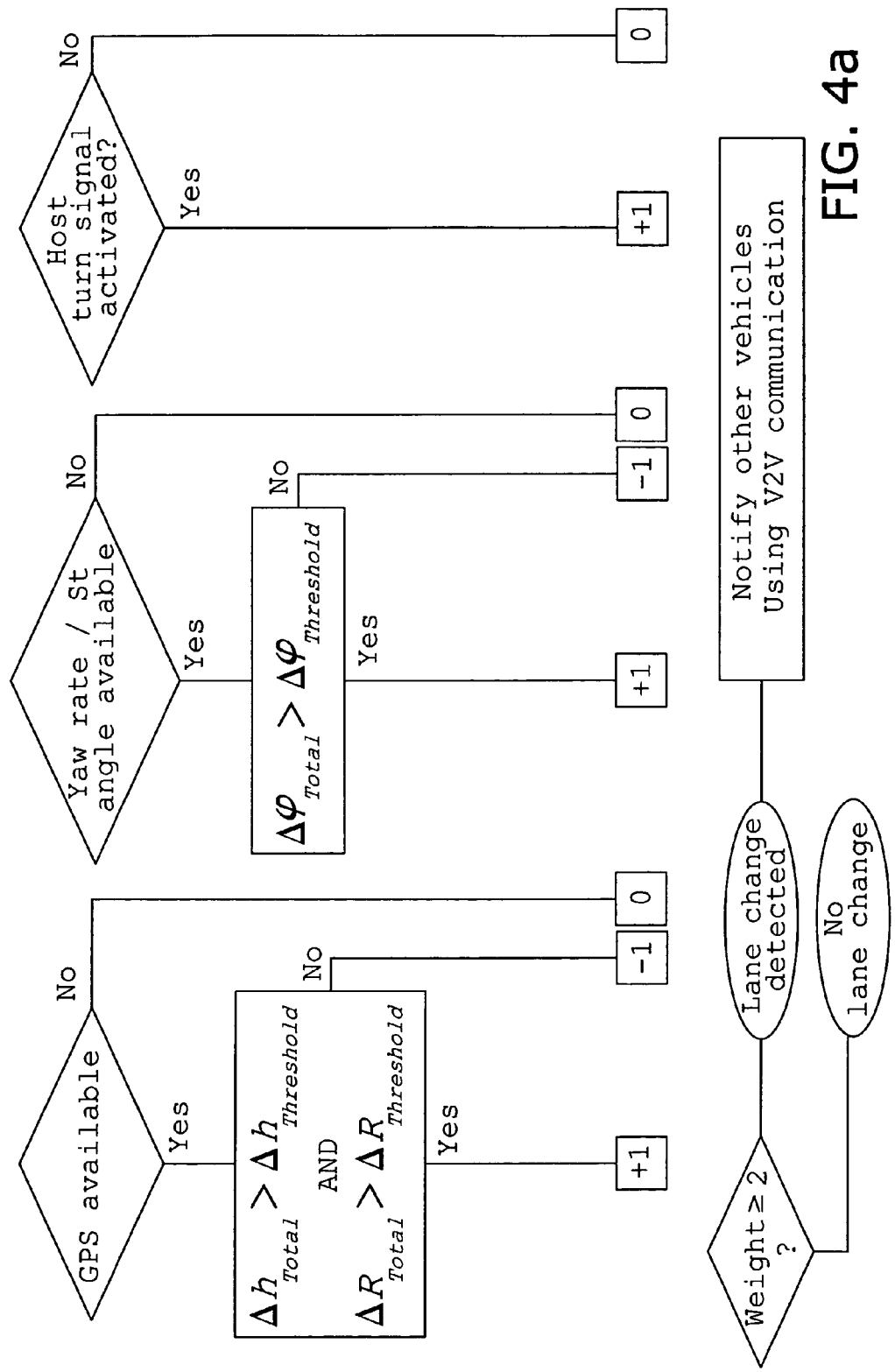

SYSTEM FOR AND METHOD OF DETERMINING A HOST VEHICLE LANE CHANGE

This application is a continuation-in-part of U.S. application Ser. No. 11/207,168 filed Aug. 18, 2005, and entitled "SYSTEM FOR AND METHOD OF DETECTING A COLLISION AND PREDICTING A VEHICLE PATH", the entirety of which is expressly incorporated herein by reference, and assigned to the assignee of the present invention. The present application and the priority application contain overlapping, but claim different subject matter.

BACKGROUND OF THE INVENTION

1. Technical Field

The present invention relates to active safety applications and real-time vehicle tracking systems, and more particularly to an improved system for determining a host vehicle congruent path divergence relative to at least one traveling remote vehicle.

2. Background Art

It has long been desirous to facilitate the tracking of an arrear vehicle in various situations, for example, such as night-time, guidance, safety, or convoy scenarios. Active safety applications and tracking systems have been developed to help monitor traffic motion among transportation machines, such as boats, automobiles, and aircrafts. These conventional applications and systems typically rely upon the ability to determine the accurate relative positioning, and predictable driving trajectories of host and surrounding vehicles to provide vehicle positioning/tracking. To accomplish these tasks, current state of the art approaches use inputs from a variety of external vehicle sensors that detect surrounding vehicles, and calculate their relative range, range rate of change, and heading. These sensor inputs are then utilized by a controller to determine a projected path, or to alert the host or remote vehicle of a pre-determined event.

Though commonly used, these multi-sensor based systems present general concerns and inefficiencies. For example, to provide three-hundred-and-sixty degree detection numerous sensors are required, which significantly increase the total product and repair costs of the host vehicle. The numerous sensors are unreliable due to the extra complexity involved in interpreting and fusing sensory inputs in the final decision making algorithms. Further, the complexity of these conventional systems increases labor costs associated with training, manufacture, and design.

These systems are also limited operationally due to inflexible vehicle-specific configurations. Of primary concern, these systems are limited by the capabilities of the sensors. Additionally, proper sensory performance is also affected by increasingly complex and over-burdened vehicle communication networks. In this configuration, each separately performing sensor that presents an electrical control unit utilizes available bandwidth for inter-nodal communication, such that the more sensors utilized, the greater the necessary bandwidth and processing capability. Where baud rates or capacity becomes insufficient, backlogging of sensory inputs may cause poor performance or the failure of the conventional system.

In the mean time, Vehicle-to-Vehicle (V2V) communication systems have been developed for relaying in-vehicle data to other V2V equipped vehicles within the operating range of the communication system. These V2V systems typically employ one of several conventional short-range communication technologies such as Radio Frequency (RF), or a short-range local radio network, to deliver their messages. Though often interconnected within the intra-vehicle communication network, which includes the active safety application, and typically providing greater than sensory range, conventional V2V communication systems have not been adapted for use by preventative tracking solutions. Instead, V2V functionality is frustrated, in this regard, where a misguided arrear vehicle veers from the desirous path and falls out of sensory tracking range.

DISCLOSURE OF INVENTION

In the present invention, a system and method of determining a congruent path divergence, such as a lane change, by an arrear vehicle, is described. The inventive system preferably relies upon pluralities of position coordinates, yaw rates, and headings for a host vehicle and at least one remote vehicle, to determine relative yaw, lateral distance, and heading discrepancies for the host vehicle. The inventive system utilizes trigonometric relationships and extrapolation between successive points within a measurement period, wherein the position coordinates, yaw rate, and heading of the vehicles are determined at each point.

A first aspect of the present invention concerns a tracking system adapted for use with a traveling host vehicle spaced from and communicatively coupled to at least one traveling remote vehicle that precedes the host vehicle. The system includes a remote vehicle locator device configured to determine and cause to be stored for at least a period sets of current position, and trail coordinates for said at least one remote vehicle. A remote vehicle sensor is configured to determine and cause to be stored for at least a period a data value of a condition relating to the remote vehicle, at each of said stored remote vehicle positions. A host vehicle locator device is included and configured to determine and cause to be stored for at least a period sets of current position and trail coordinates for said host vehicle, while a host vehicle sensor is likewise configured to determine and cause to be stored for at least a period data values of the condition relating to the host vehicle, at the current host vehicle position.

Finally, an inventive host vehicle controller is communicatively coupled to the devices and sensors, and configured to compare the current position and trail coordinates of the host and remote vehicles, so as to determine the relative positioning of the vehicles. The controller is further configured to compare the host vehicle current position data value to the stored remote vehicle data values at the two most proximate remote vehicle trail coordinates, relative to the current host vehicle position, when the remote vehicle precedes the host vehicle, so as to autonomously determine a data discrepancy. The controller is further configured to compare the discrepancy to a threshold, so as to determine a congruent path divergence by the host vehicle, wherein said data, discrepancy, and threshold are cooperatively configured to indicate the congruent path divergence by the host vehicle.

A second aspect of the present invention concerns a method of detecting the path divergence of a traveling host vehicle by a communicatively coupled congruently traveling remote vehicle. The method comprises the steps of determining and storing a plurality of sets of current position and trail coordinates, and yaw rates at each set of coordinates, for the traveling remote and host vehicles. Next, the sets of coordinates are compared to determine lateral deviation of the host vehicle relative to the remote vehicle trail coordinates so as to determine the relative positioning discrepancies of the vehicles, and the relative headings of the vehicles at each set of coordinates are determined. The yaw rates and headings of the host vehicle at its current position coordinates, and the two most proximate remote vehicle trail coordinates relative to the current host vehicle position are compared, so as to determine yaw rate and heading discrepancies, when the plurality of sets of coordinates indicate that the remote vehicle precedes the host vehicle, and the vehicles are congruently traveling. Finally, the discrepancies are compared to respective thresholds, so as to determine a path divergence by the host vehicle, which is then communicated to the remote vehicle.

It will be understood and appreciated that the present invention provides a number of advantages over the prior art, including, for example, providing an improved method of determining whether a trailing vehicle has veered off of a path congruent to a monitoring remote vehicle. This invention applies to both straight and curved road segments because of the position, yaw rate and heading differentials used in determining the host vehicle lane changing. This invention increases the efficiency of guidance and traffic control systems, by reducing the use of sensors to detect the movements of the targeted vehicle. The use of vehicle-to-vehicle (V2V) communication provides greater range and function than that of conventional sensor-based systems.

Other aspects and advantages of the present invention will be apparent from the following detailed description of the preferred embodiment(s) and the accompanying drawing figures.

BRIEF DESCRIPTION OF DRAWINGS

A preferred embodiment of the invention is described in detail below with reference to the attached drawing figures, wherein:

FIG. 4 is a flow diagram of a preferred method of performing the present invention, wherein non-compliant yaw rate, heading, and lateral distance discrepancies must be determined in order to detect a congruent path divergence;

FIG. 4a is a flow diagram of a second preferred method of performing the present invention, wherein the path divergence is determined by a weight factor, which is computed based on the availability/actuation of various system components, and the surpassing of discrepancy thresholds;

FIG. 5 is a line graph displaying a yaw rate discrepancy profile during a right congruent path divergence; and FIG. 6 is a line graph displaying a yaw rate discrepancy profile during a left congruent path divergence.

MODES FOR CARRYING OUT THE INVENTION

Figure 1:
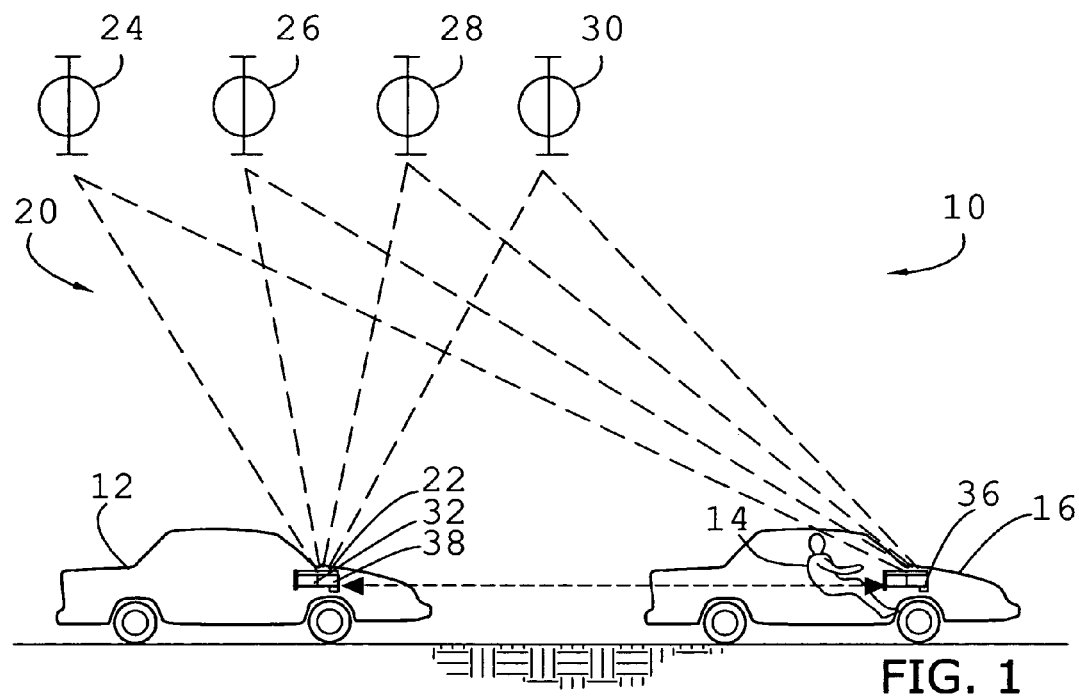
FIG. 1 is an elevation view of a host vehicle, and a remote vehicle communicatively coupled to the host vehicle, in accordance with a preferred embodiment of the present invention.

As shown in FIG. 1, the present invention concerns a vehicle tracking system 10 adapted for use with a host vehicle 12, and for alerting the operator 14 of a remote vehicle 16. The system 10 is illustrated and described herein with respect to vehicles, such as cars, SUV's, trucks, etc. However, it may also be utilized with airborne and watercraft vehicles, human motility, or other modes of transportation where path congruency is desired. The system 10 is configured to determine a plurality of trail coordinates 12t, and a current position coordinate 12c for the host vehicle 12, and a similar set of coordinates 16t, and 16c, for at least one remote vehicle 16, as shown in FIG. 2. Except where a plurality is necessary for discussion, the present invention shall hereinafter be described with respect to a remote vehicle 16, with the understanding that the inventive aspects of the invention may be concurrently performed with respect to a plurality of remote vehicles, wherein the results from each remote and host vehicle relationship may be further averaged or otherwise manipulated prior to achieving a final determination of host vehicle path divergence, if the remote vehicles 16 are also congruently traveling.

Figure 1A:
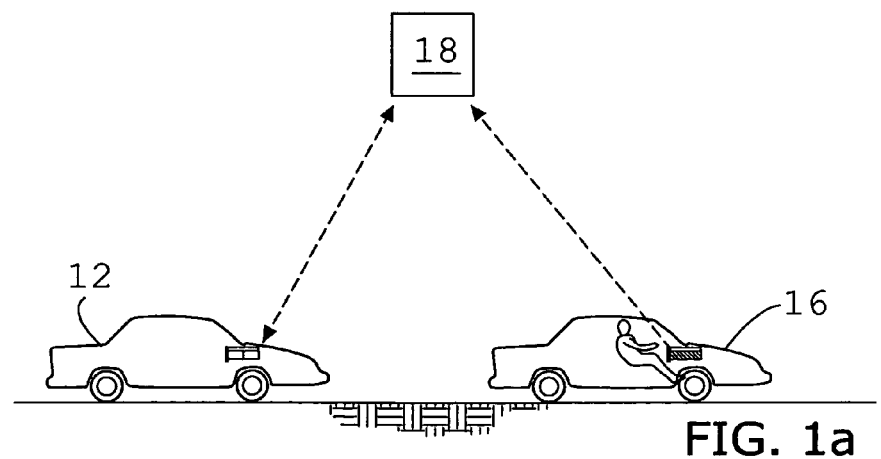
FIG. 1a is an elevation view of the host and remote vehicles shown in FIG. 1 communicating through a third-party intermediary.

As previously mentioned, an inventive aspect of the present invention is the use of V2V communication technology to detect lane level relative positioning and determine congruent path divergence. Thus, the host vehicle 12 and remote vehicle 16 are communicatively coupled by suitable wireless technology. For example, the vehicles 12,16 may be coupled by a radio local area network, RF technology, or other conventional means that enables inter-vehicle sharing of information in real-time. Alternatively, the vehicles 12,16 may be communicatively coupled through an intermediary third-party 18 (see, FIG. 1a) that continuously collects the relevant position data, performs the determinations described herein, and transmits an alert of a congruent path divergence back to the remote vehicle 16. It is appreciated that the reliability of the safety application depends on the accuracy of the V2V communication system involved.

A locator device 20 is adapted for use by the host and remote vehicles 12,16. The device 20 is configured to determine and store or caused to be stored for at least a period the current position coordinates, and pluralities of trail coordinates for the host and remote vehicles 12,16. As shown in FIG. 1, a preferred locator device 20 is configured to determine longitude, latitude, and more preferably, height coordinates, using GPS; and as such, further includes a GPS receiver 22 within each vehicle 12,16, and at least four mapped satellites 24,26,28,30 communicatively coupled and configured to deliver separate transmission signals to each receiver 22 at all times. Alternatively, other signal sources located at control points could be communicatively coupled to the receiver 22, and other coordinate systems based on a variety of geodetic datums, units, projections, and references, such as Military Grid Reference System (MGRS) or ECEF X, Y, Z could be utilized in accordance with the present invention.

The preferred system 10 is adapted for use with a conventional navigation system so as to enable visual perception of a detected congruent path divergence (or lane-change, as shown in the illustrated embodiment) by the operator 14. In this regard, the preferred locator device 20 also includes map databases 32 preferably housed within the remote and host vehicle 12,16. Each database 32 has at least one map record 32a consisting of global positioning points. The device 20 is configured to match the host and remote current position and trail coordinates to corresponding points on the map record 32a. As shown in FIG. 2, as is customary in this configuration, the preferred system 10 further includes a monitor 34 that is communicatively coupled to the database 32 and device 20, and configured to display the map record 32a and coordinates. The database 32 may be stored by conventional storage means, such as CD-ROM, internal hard disk, and removable memory cards.

The inventive system 10 is configured to autonomously determine, and communicate (i.e. without operator participation) to the remote vehicle 16, the occurrence of a path divergence by the host vehicle 12. The inventive algorithms are based on sets of current position and trail coordinates of the vehicles 12,16, and on data values of at least one condition existent to both vehicles at each of the set of coordinates. In a preferred embodiment of the present invention, each of the vehicles 12,16 includes at least one sensor 36 configured to determine and cause to be stored data values of at least one condition. For example, in the illustrated embodiment, each vehicle 12,16 is equipped with a yaw gyro operable to detect the instantaneous yaw rate, v, of the measuring vehicle at each position. Alternatively, or more preferably, in addition to, each vehicle 12,16 may further include a steering angle sensor, operable to detect the angle of rotation of the steering wheel. The preferred sensor 36 may also include memory capabilities, so as to store the data values itself.

At the host vehicle 12, a controller 38 is communicatively coupled to the device 20, and the remote vehicle 16, so as to receive position and condition data from the remote vehicle 16 through the V2V communication system. The preferred controller 38 is programmably configured to further determine similar host vehicle data, and more preferably, compute data values of additional desirous conditions in path divergence determination. For example, in the preferred embodiments, the controller 38 is configured to receive the yaw rates (or steering angles, if available), and coordinates, and to determine a heading, h, for each of the host and remote vehicle 12,16, based on their respective coordinates, and yaw rates.

The preferred controller 38 is configured to generate an audible, visible and/or haptic (e.g., a gentle seat vibration in the corresponding side) alert 34a at the remote vehicle (see, FIGS. 2a, and b), when a host vehicle path divergence is determined. More particularly, the preferred controller 38 is configured to generate the alert when the condition deviates greater than a minimum threshold. More preferably, one of a plurality of alerts that convey varying degrees of deviation and corresponds to one of a plurality of thresholds, may be produced as further described herein. For example, a plurality of alerts may vary in indicia, color, pitch, loudness, location, font, verbiage, flashing rates, etc.

Figure 2A:
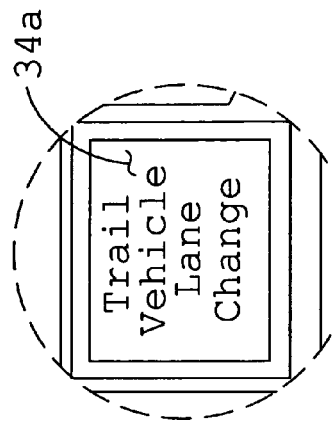
FIG. 2a is an elevation view of the monitor displaying a divergence alert signal.
Figure 2B:
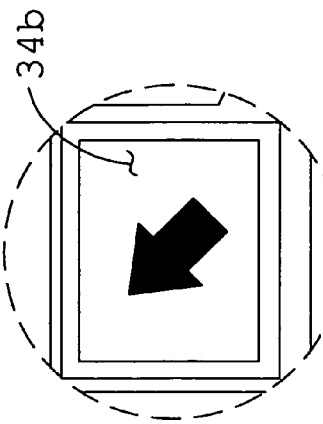
FIG. 2b is an elevation view of the monitor displaying a directional alert signal.
Figure 2:
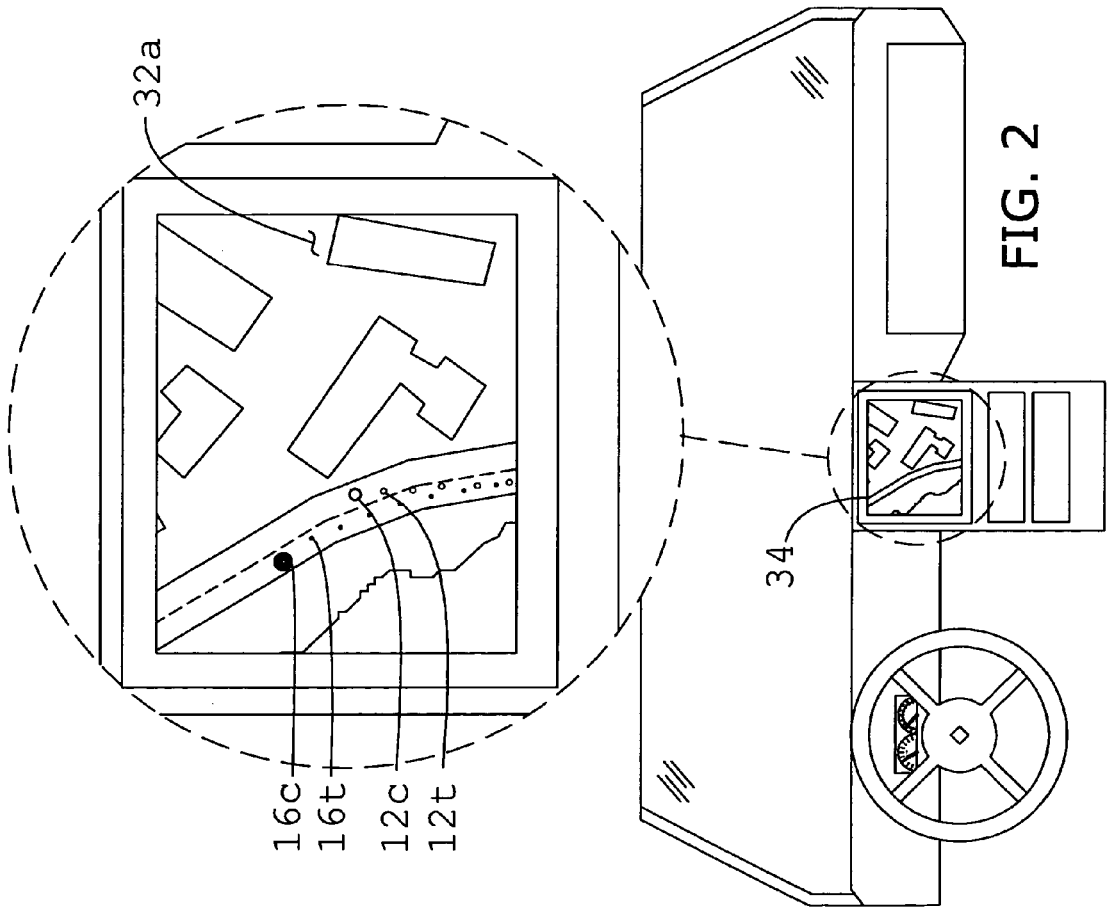
FIG. 2 is an elevation view of the dashboard of the host vehicle and collision control system shown in FIG. 1, particularly illustrating a monitor, and map record.

More particularly, as shown in FIG. 2a, an exemplary collision detection signal 34a may include the intermittent display of indicia, such as "TRAIL VEHICLE LANE CHANGE" on the monitor 34. As shown in FIG. 2b, an exemplary path divergence alert 34b may be a display of one of a plurality of arrows that direct the operator 14 towards the direction of the path divergence, i.e. left or right. Finally, the signals 34a,b are provided for a predetermined and preferably modifiable period, sufficient to alert the operator 14 satisfactorily.

Thus, the preferred system 10 is configured to initially determine the relative positioning of the host and remote vehicles. A preferred method utilizes the current position and trail coordinates, yaw rates, and more preferably, the headings of the host and remote vehicles 12,16 to determine a congruently traveling remote vehicles 16. A preferred embodiment of the inventive algorithms and programmed functions of the controller 38 to determine a congruent path divergence is more particularly described as follows:

I. Identify Vehicles Traveling in the Same Direction

Remote vehicles 16 traveling in the same direction with the host vehicle 12 are determined by comparing the relative headings. Inequality (1) yields the subset of such vehicles:

$$\cos \theta_h \cos \theta_s + \sin \theta_h \sin \theta_s > 0.5 \quad (1)$$

wherein $\theta_h$ is the host vehicle heading at a time, t, $\theta_s$ is the remote vehicle heading, and a true value for the inequality yields a same relative direction of travel. Conversely, a sum of the products less than 0.5 yields an opposite relative direction of travel for the host and remote vehicles 12,16. To simplify the process, the host vehicle heading $\theta_h$ is preferably set to zero for the chosen coordinate system, so that inequality (1) becomes $\sin \theta_h \sin \theta_s > 0.5$. Remote vehicles traveling upon the same thoroughfare as, within the V2V range of, but in the opposite direction to the host vehicle 12 are not further considered by the system 10.

II. Classify Vehicles Traveling in the Same Direction into Lane Level Traffic

Remote vehicles 16 traveling in the generally same direction as the host vehicle 12, are categorized in one of a plurality of relative positions by comparing the current position coordinates of the host and remote vehicles 12,16. By considering the host vehicle heading, these remote vehicles 16 may initially be separated into "arrear" and "ahead" (or preceding) sets, wherein generally arrear remote vehicles 16 are determined when the host vehicle acts to increase the distance between the two. More preferably, remote vehicles 16 located arrear of the host vehicle 12 are computationally determined by inequality (2):

$$(x_s - x_h)\cos \theta_h + (y_s - y_h)\sin \theta_h < 0 \quad (2),$$

wherein $x_s, y_s$ are coordinates of the remote vehicle 16, and $x_h, y_h$ are coordinates of the host vehicle 12. A sum of the products greater than zero (>0) results when the remote vehicle 16 is located ahead of the host vehicles 12. It is appreciated, however, that height coordinates, $z_x$, are not considered, so as to present a simplified planar analysis.

If desirous, relative lane position can be determined by computing a lateral offset between the trails and current position coordinates of the host and remote vehicles 12,16 at the beginning time, t, of the sample period. In this configuration, thresholds can be used to define lane offsets. For example, a lateral offset between negative one and positive one may indicate that the host and remote vehicles 12,16 share the same lane. By taking a perpendicularly lateral offset at a given coordinate, it is appreciated that this method is equally functional on straight and curved thoroughfares.

Figure 3:
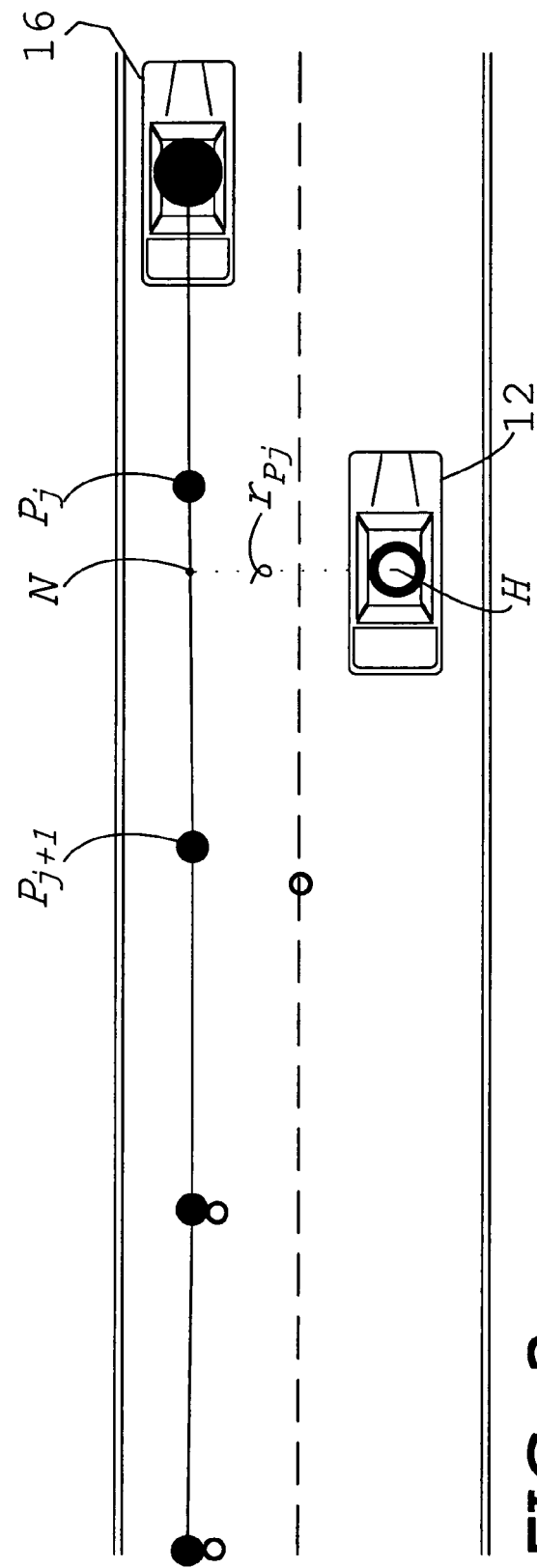
FIG. 3 is a plan view of a host vehicle and a remote vehicle traveling upon lanes of a multi-lane thoroughfare, particularly illustrating current position and trail coordinates, and a congruent path divergence by the host vehicle.

In FIG. 3, $r_{Pj}$, is the orthogonal or minimum distance between the current position of the host vehicle and the line defined by the two most proximate trail coordinates of the remote vehicle 16, thereto. More particularly, as shown in FIG. 3, the minimum distance, $r_{Pj}$, is measured from an extrapolated point N ($x_N, y_N, v_N, h_N$) on the line or path. The change in the minimum distance at a subsequent position and time is determined accordingly:

$$\delta r_H = ((x_H - x_N)^2 + (y_H - y_N)^2)^{0.5} - r_t \quad (3),$$

where $r_t$ is the minimum distance taken at the beginning of the sampling period.

The extrapolated point is trigonometrically determined from the two most proximate remote vehicle trail coordinates and the current host vehicle position. The estimated condition values at N are also extrapolated from the yaw rates and headings at the two most proximate remote vehicle trail coordinates. For example, where $P_j$ ($x_{Pj}, y_{Pj}, v_{Pj}, h_{Pj}$), and $P_{j+1}$ ($x_{Pj+1}, y_{Pj+1}, v_{Pj+1}, h_{Pj+1}$) represent the two most proximate points, and the change in yaw rate at position $P_j$, $\delta v_{Pj}$, is equal to the yaw rate at position $P_j$ minus the yaw rate at position $P_{j+1}$, the change in yaw rate at the extrapolated position, $\delta v_N$, is computable as follows:

$$(\delta v_{Pj}/(P_{j+1})(P_j))(P_{j+1}N) \quad (4),$$

wherein $(P_{j+1})(P_j)$ is the linear distance between the two most proximate trail coordinates, and $P_{j+1}N$ is the linear distance between the extrapolated point and trail position $P_{j+1}$. Thus, in this configuration, the estimated yaw rate, and likewise heading, at the extrapolated position, N, are determinable as follows:

$$v_N = v_{Pj+1} + \delta v_N \quad (5), \text{ and}$$

$$h_N = h_{Pj+1} + \delta h_N \quad (6).$$

III. Detecting Congruent Path Divergence (Lane Change)

The host vehicle 12 maintains a congruent path, when its condition data values generally match (i.e. are within acceptable measurement and sensory error limits) remote vehicle condition data values at the extrapolated positions. The host vehicle 12 may be configured to autonomously determine whether a trailing remote vehicle and the host vehicle 12 have congruent paths, and deliver a message to the trailing remote vehicle instructing it to monitor and communicate the existence of a path divergence, so that the host vehicle 12 becomes a remote vehicle 16 as described herein. Alternatively, the operators of the two vehicles may manually establish such a relationship. Under either configuration, however, once a congruent path is determined, path divergence is monitored by determining the difference (or discrepancy) between the condition data value at the current host vehicle position, and the extrapolated remote vehicle trail position, $\delta v_H$, and comparing the discrepancy to a predetermined threshold (e.g. a yaw rate difference of greater than 10%). Where the discrepancy exceeds the condition threshold configured to tolerate natural in-lane path fluctuations, a divergence is realized.

More preferably as shown in FIG. 4, the system 10 is configured to sense and determine a plurality of matching conditions (e.g. yaw rate, heading, and lateral distance), and determine a discrepancy for each. A divergence in this configuration results only where each condition discrepancy exceeds its corresponding threshold. Alternatively, however, multiple condition analysis may be configured to provide redundancy by considering them alternatively, or in parallel. For example, a routine may be utilized, that attributes +1, 0, or −1 points to a weight factor depending upon the availability/actuation of a GPS system, a yaw rate sensor, a steering angle sensor, and turn signal activation sensor, and whether or not a discrepancy threshold has been surpassed. As shown in FIG. 4a, such a routine may be configured to attribute less weight to related thresholds, by requiring the satisfaction of both prior to attributing a point, and to determine and alert other vehicles of a path divergence, where the total weight factor is greater than two. Finally, the preferred thresholds are variable according to user preference, and/or application.

As previously mentioned, the system 10 is configured to determine a condition discrepancy at a plurality of current host vehicle positions during a sampling period, wherein said period extends from a beginning time, t, through a termination time $T_L$, so as to form a discrepancy profile. In this configuration, the total cumulative value of discrepancies for a given condition is determined according to the following formulas:

$$\Delta \varphi_{Total} = \sum_{t}^{t+T_L} \delta \varphi_H, \quad (5)$$

$$\Delta h_{Total} = \sum_{t}^{t+T_L} \delta h_H, \quad (6)$$

and $$\Delta R_{Total} = \sum_{t}^{t+T_L} \delta r_H. \quad (7)$$

Thus, each total discrepancy is preferably compared to a corresponding total cumulative threshold in order to determine a path divergence. It is appreciated that utilizing a multi-entry or cumulative method reduces the chances of an alert being produced based on a single anomalistic data entry.

IV. Lane Changing Profile (Signature)

The variation of the change in the condition data value, such as the yaw rate, $\delta v_H$, during a path divergence (or lane change) period, presents the path divergence profile. As shown in FIGS. 5 and 6, the rate of change in the condition, $\Delta \delta v_H$, is presented by the steepness of the profile. A plurality of divergence categories can be distinguished according to the rate of change by analyzing the profile. For example, a sharp versus gradual divergence can be determined and alerted to the remote vehicle 16; wherein smaller periods, $T_L$, and greater maximums or peaks, $\delta v_{H\,max}$, indicate sharp (sudden) divergences, and larger $T_L$'s and smaller $\delta v_{H\,max}$'s indicate smooth divergences.

Finally, further categorization with respect to the direction of the divergence can be discerned from the profile, as shown in FIGS. 5 and 6. The sign of $\delta v_H$ indicates the divergence direction (e.g. a right or left turn); wherein positive profiles represent right divergences (see, FIG. 5), and negative profiles represent left divergences (see, FIG. 6).

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A tracking system (10) adapted for use with a traveling host vehicle (12) spaced from and communicatively coupled to at least one traveling remote vehicle (16) that precedes the host vehicle (12), said system comprising:

a locator device (20) configured to autonomously determine and cause to be stored for at least a minimum period a set current position coordinates, and a plurality of sets of trail coordinates for said host and at least one remote vehicle (12,16);

a remote vehicle sensor (36) configured to autonomously determine and cause to be stored for at least a minimum period a data value of a condition relating to the remote vehicle (16), at each of said stored remote vehicle positions;

a host vehicle sensor (36) configured to autonomously determine and cause to be stored for at least a minimum period data values of the condition relating to the host vehicle (12), at the current host vehicle position; and a host vehicle controller (38) communicatively coupled to the device (20) and sensors (36r,h), and configured to:

compare the current position and trail coordinates of the host and remote vehicles (12,16), so as to determine the relative positioning of the vehicles (12,16), compare the host vehicle current position data value to the stored remote vehicle data values at the two most proximate remote vehicle trail coordinates, relative to the current host vehicle position, when the remote vehicle (16) precedes the host vehicle (12), so as to autonomously determine a data discrepancy, and compare the discrepancy to a threshold, so as to determine a congruent path divergence by the host vehicle (12), wherein said data, discrepancy, and threshold are cooperatively configured to indicate the congruent path divergence by the host vehicle (12).

2. The system as claimed in claim 1, each of said remote and host vehicle sensors (36) including a yaw rate gyro, said condition being a instantaneous yaw rate, $\phi$.

3. The system as claimed in claim 1, each of said remote and host vehicle sensors (36) being a steering angle sensor, said condition being a steering wheel angle.

4. The system as claimed in claim 1,
each of said remote and host vehicle sensors (36) being a turn signal activation sensor,
said condition being a status of turn signal activation.

5. The system as claimed in claim 1,
said controller (38) being further configured to determine a heading, h, for each of said host and remote vehicles (12,16) at each of said positions, and compare the host vehicle heading at its current position coordinates to the stored remote vehicle headings at the two most proximate sets of trail coordinates, so as to determine a heading discrepancy.

6. The system as claimed in claim 1,
said controller (38) being further configured to trigonometrically determine a closest point along a line defined by the two most proximate set of trail coordinates, to the current host vehicle position, and extrapolate correlative condition data values at the closest point based on the condition data values at the two most proximate set of trail coordinates.

7. The system as claimed in claim 6,
said controller (38) being further configured to extrapolate remote vehicle condition values at the closest point, in accordance with the following formula:

$$(\Delta(\text{data value})_{P_j}/P_{j+1}P_j)(P_{j+1}N),$$

where,
$\Delta(\text{data value})_{P_j}$ is equal to the difference between the data values at the two most proximate sets of remote vehicle trail coordinates relative to the current host vehicle coordinates,
$P_{j+1}P_j$ is the linear distance between the two most proximate remote vehicle trail positions, and
$P_{j+1}N$ is the linear distance between an extrapolated position and a most antecedent of the two most proximate sets of remote vehicle trail coordinates.

8. The system as claimed in claim 6,
said controller (38) being further configured to determine a change in lateral distance, based on the host vehicle current position and trail coordinates, and correlative extrapolated remote vehicle trail coordinates, and further compare the change in lateral distance to a distance threshold, so as to determine the congruent path divergence.

9. The system as claimed in claim 1,
said controller (38) being further configured to determine the data discrepancy at a plurality of host vehicle positions during the period, so as to determine a plurality of data discrepancies, a discrepancy profile based on the discrepancies and period, and a cumulative discrepancy summation, and compare the summation to a cumulative threshold, so as to determine the congruent path divergence by the host vehicle (12) during the period.

10. The system as claimed in claim 9,
said controller (38) being further configured to compare the discrepancy profile to a plurality of varying thresholds, so as to determine one of a plurality of categories of congruent path divergence by the host vehicle (12).

11. The system as claimed in claim 10,
said controller (38) being further configured to determine a sharp or gradual divergence by the discrepancy profile.

12. The system as claimed in claim 10,
said controller (38) being further configured to determine a left or right divergence by the discrepancy profile.

13. A lane change determination system (10) adapted for use with a traveling host vehicle (12) spaced from and communicatively coupled to at least one traveling remote vehicle (16) that precedes the host vehicle (12), said system comprising:

a locator device (20) configured to autonomously determine and cause to be stored for at least a minimum period sets of current position, and trail coordinates for said host and at least one remote vehicle (12,16);

a remote vehicle yaw gyro (36) configured to autonomously determine and caused to be stored for at least a minimum period a data value of the instantaneous yaw rate of the remote vehicle (16) at each of said stored remote vehicle positions;

a host vehicle yaw gyro (36) configured to autonomously determine and caused to be stored for at least a minimum period a data value of the instantaneous yaw rate of the host vehicle (12) at the current host vehicle position; and a host vehicle controller (38) communicatively coupled to the device (20) and gyros (36), and configured to:

compare the current position and trail coordinates of the host and remote vehicles (12,16), so as to determine the relative positioning of the vehicles (12,16), determine a heading for each of said host and remote vehicles (12,16) at each of said positions, compare a host vehicle current position yaw rate, and heading to the stored remote vehicle yaw rates and headings at the two most proximate remote vehicle trail coordinates, relative to the current host vehicle position, when the remote vehicle (16) precedes the host vehicle (12), so as to autonomously determine a data discrepancy, and compare the discrepancy to a plurality of varying thresholds, so as to determine one of a plurality of categories of congruent path divergence by the host vehicle (12).

14. A method of detecting a path divergence of a traveling host vehicle (12) by a communicatively coupled and congruently traveling remote vehicle (16), said method comprising:

a) determining and storing a plurality of sets of current position and trail coordinates for the traveling remote and host vehicles;

b) comparing the plurality of sets of coordinates, so as to determine the relative positioning of the vehicles (12, 16);

c) determining a relative headings for each of the vehicles (12,16) at each set of coordinates, and comparing the headings of the host vehicle (12) at its current position coordinates, and the two most proximate remote vehicle trail coordinates relative to the current host vehicle position, so as to determine a heading discrepancy, when the plurality of sets of coordinates indicate that the remote vehicle (16) precedes the host vehicle (12);

d) comparing each discrepancy to a respective threshold, so as to determine a path divergence by the host vehicle (12); and e) communicating the host vehicle path divergence to the remote vehicle (16) utilizing vehicle-to-vehicle communication.

15. The method as claimed in claim 14, steps (a), and (c) further including the steps of sensing yaw rates at each set of coordinates, for the traveling remote and host vehicles (12,16), and comparing the yaw rates and headings of the host vehicle (12) at its current position coordinates, and the two most proximate remote vehicle trail coordinates, so as to determine yaw rate and heading discrepancies, when the plurality of sets of coordinates indicate that the remote vehicle precedes the host vehicle.

16. The method as claimed in claim 14, steps (a), and (c) further including the steps of determining a minimum distance between the current host vehicle position, and a line defined by the two most proximate remote vehicle trail coordinates at multiple instances during a period, and comparing the yaw rates, headings, and minimum distances, so as to determine yaw rate, heading, and minimum distance discrepancies, when the plurality of sets of coordinates indicate that the remote vehicle (16) precedes the host vehicle (12).

17. The method as claimed in claim 14, steps (a), and (c) further including the steps of sensing yaw rates, steering angles, or turn signal activation, and determining a minimum distance between a current host vehicle position, and a line defined by the two most proximate remote vehicle trail coordinates at multiple instances during a period, and comparing the yaw rates, headings, and minimum distances, so as to determine yaw rate, heading, and minimum distance discrepancies, when the plurality of sets of coordinates indicate that the remote vehicle (16) precedes the host vehicle (12), step (d) further including the steps of determining a weight factor based on turn signal activation status, and discrepancy threshold comparisons, and comparing the weight factor to a weight threshold to determine a path divergence.

* * * * *